No. 857,450. PATENTED JUNE 18, 1907.
A. D. DE LAND.
FILTER.
APPLICATION FILED OCT. 6, 1906.
2 SHEETS—SHEET 1.
Fig. 1.
Fig. 2.
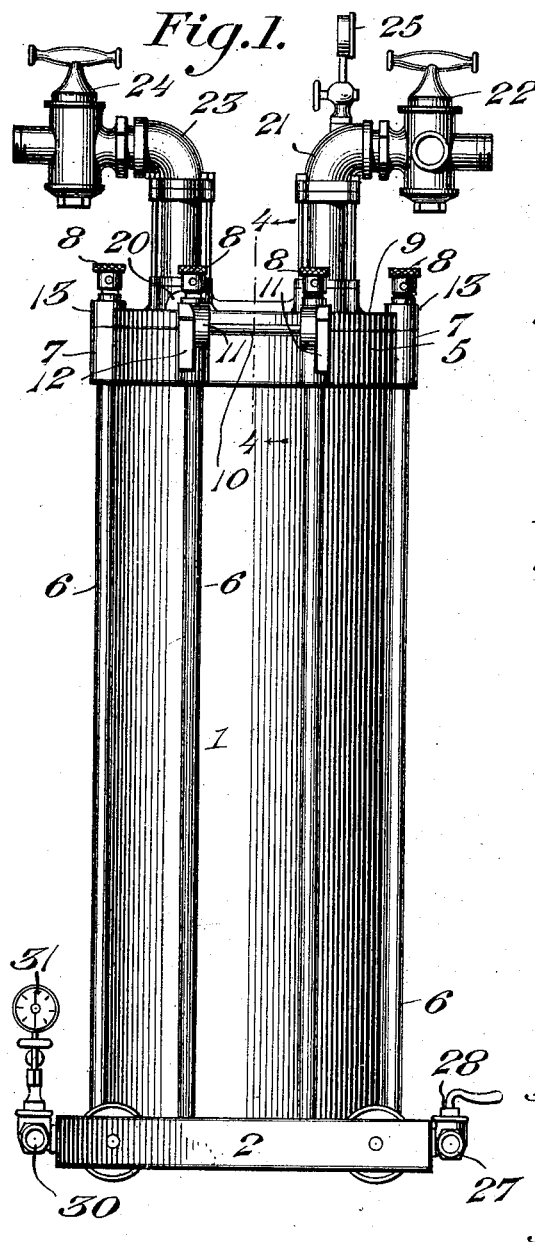
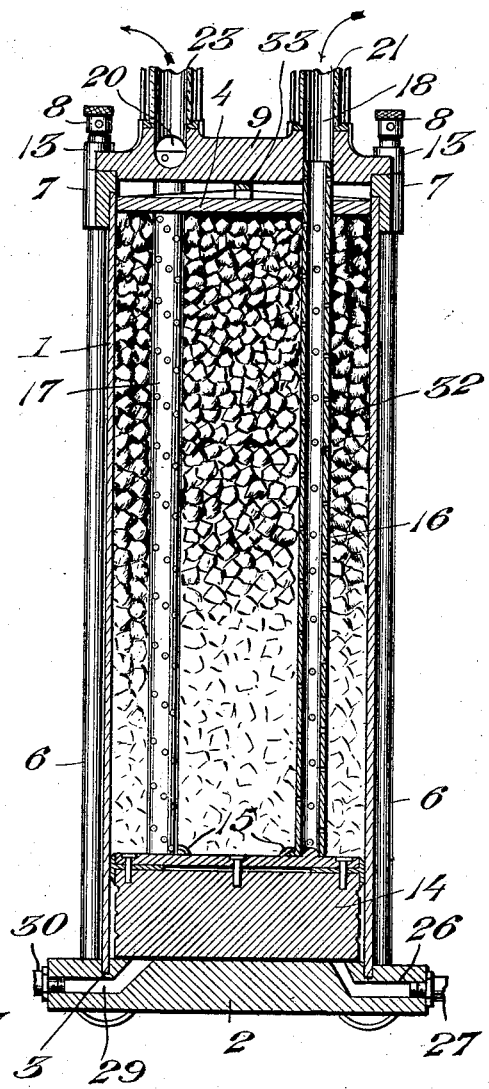
Inventor
Ambrose D. De Land.
Witnesses
Phil. E. Barnes
D. S. Elmore
By Victor J. Evans
Attorney

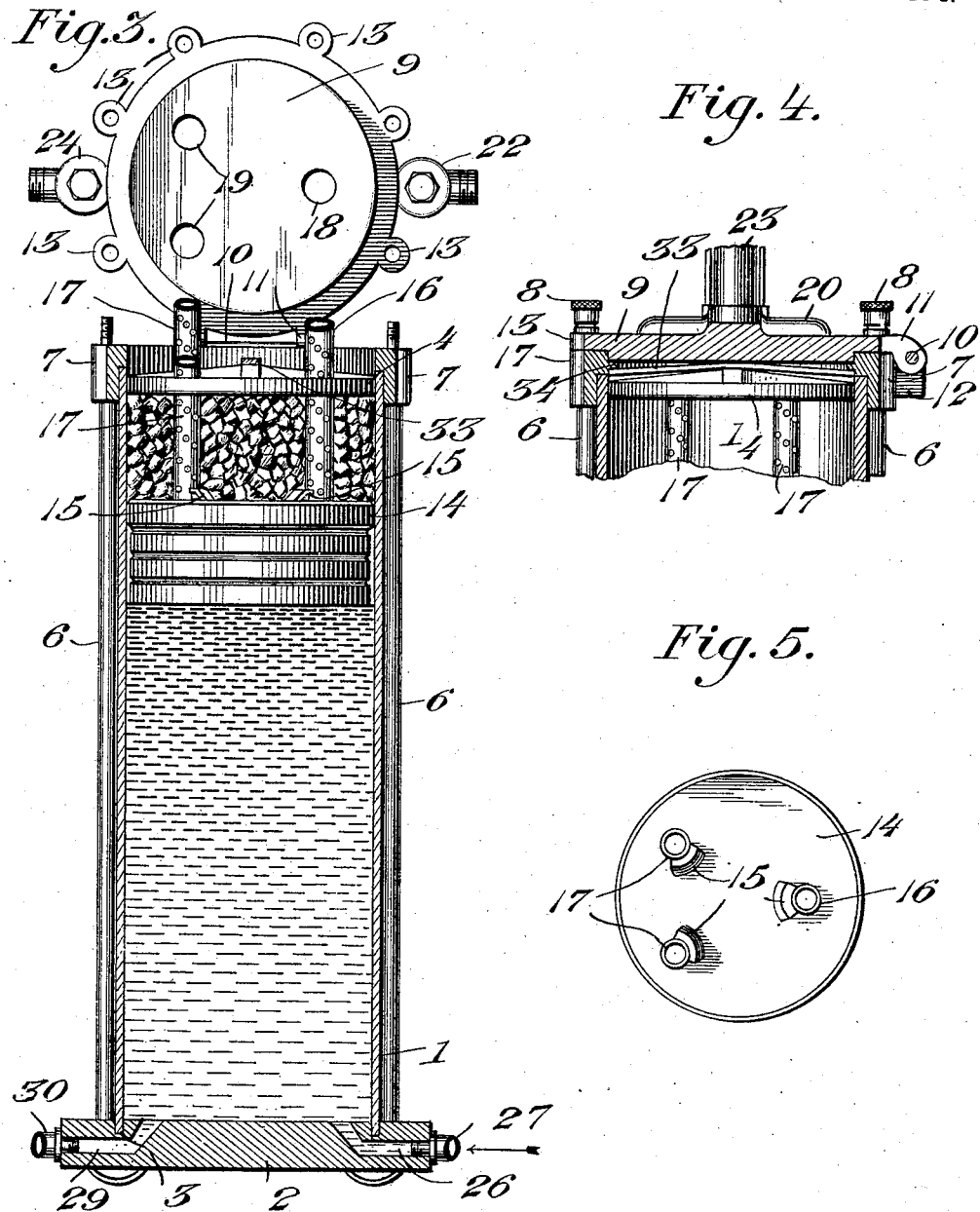

UNITED STATES PATENT OFFICE.

AMBROSE D. DE LAND, OF SHEBOYGAN, WISCONSIN.

FILTER.

No. 857,450.  Specification of Letters Patent.  Patented June 18, 1907.

Application filed October 6, 1906. Serial No. 337,724.

*To all whom it may concern:*

Be it known that I, AMBROSE D. DE LAND, a citizen of the United States, residing at Sheboygan, in the county of Sheboygan and State of Wisconsin, have invented new and useful Improvements in Filters, of which the following is a specification.

This invention relates to filters designed especially for filtering beer or analogous aerated liquids, and has for its objects to provide a comparatively simple, inexpensive device of this character whereby the liquid will be effectually filtered and purified, one wherein the discharging capacity of the filter will be somewhat greater than its receiving capacity, thus to relieve undue pressure in the device and insure a gradual percolation of the liquid through the filtering medium, and one in which the ingress and egress of the liquid may be readily controlled.

Further objects of the invention are to provide for the ready introduction and proper packing of the filtering material within the vessel and to provide simple and efficient means for detachably securing the head or cover of the vessel in place.

With these and other objects in view, the invention comprises the novel features of construction and combination of parts more fully hereinafter described.

In the accompanying drawings: Figure 1 is a side elevation of a filter embodying the invention. Fig. 2 is a vertical section taken centrally and longitudinally therethrough, the upper ends of the inlet and outlet pipes being broken away. Fig. 3 is a view similar to Fig. 2, showing the manner of charging the vessel with the filtering material. Fig. 4 is a detail sectional view taken on the line 4—4 of Fig. 1 and looking in the direction of the arrow. Fig. 5 is a top plan view of the piston, showing the manner of engaging the lower ends of the filtering tubes therewith.

Referring to the drawings, 1 designates the filtering vessel or tank preferably comprising a cylindrical tubular body portion having a lower end head 2 in which is formed an annular groove or seat 3, in which is fitted the lower end of the cylinder, and with an upper end head 4, there being fitted on the upper end of the cylinder an annular ring or collar 5 secured in place by means of a plurality of vertical tie rods 6 having their lower ends attached to the head 2 and extended at their upper ends through tubular bearings 7 formed on the collar 5 and threaded for the reception of clamping nuts 8.

Arranged on the upper end of the vessel is a lid or cover 9 hingedly secured in place by means of a pintle 10 extended through ears 11 on the cover and companion ears 12 formed on the collar 5, there being provided on said cover a plurality of radiating perforated bearing ears 13 adapted to register with and seat over the upper ends of the rods 6 and to be engaged by the nuts 8 for fixedly securing the cover in place, it being understood that by removing the nuts the cover may be swung to the open position illustrated in Fig. 3 for a purpose which will hereinafter appear.

Arranged within the filtering vessel 1 and for movement longitudinally thereof is a piston head 14 provided on its upper face with a plurality of recessed lugs 15 with which are detachably engaged the lower ends of a plurality of perforated filtering tubes 16 and 17 extended longitudinally through the vessel and of which the former has its upper end seated in an opening 18 formed in the cover 9, while the tubes 17, of which there are two, have their upper ends seated in like manner in openings 19 formed in the cover and in turn joined by a tubular duct 20 formed on the cover and through which the tubes 17 communicate at their upper ends one with the other.

Coupled to the cover 9 for communication with the tube 6 through the opening 18 is an inlet pipe 21 having a cut-off valve 22 arranged therein, there being also coupled to the cover and for communication with the duct 20 at the longitudinal center of the latter an outlet pipe 23 having therein a cut-off valve 24, while mounted on the inlet pipe 21 and for communication therewith is a pressure gage 25.

Formed in the lower end head 2 and for communication at its inner end with the tank 1 is an inlet passage 26 having a water supply pipe 27 coupled to its outer end, there being arranged in the pipe 27 a cut-off valve 28, while coupled to the outer end of a second passage 29 formed in the head 2 is a discharge pipe 30 having mounted thereon a pressure gage 31, it being understood, of course, that the passage 29 hereinafter termed the discharge passage, communicates at its inner end with the interior of the tank 1 beneath the piston 14, as in the instance of the inlet passage 26. The tank is normally filled above the piston 14 with a charge of crushed charcoal filter mass or other suitable filling material 32.

The head 4 is removably fixed in place by means of a spring clamping bar 33 adapted for terminal engagement with lugs 34 projecting from the inner face of the ring 5, it being understood, of course, that by turning the bar 33 out of engagement with the lugs the head 4 may be moved upward.

In practice, the beer or other liquid to be filtered is by opening the valve 22 admitted through pipe 21 and tube 16 into the tank 1, it being understood that the liquid will pass downward through the tube outward through the perforations therein into the tank 1. The liquid upon entering the tank percolates through and is filtered by the material 32 and finally passes into the perforated tubes 17 and thence through the connecting duct 20 to the discharge pipe 23, it being noted in this connection that owing to the provision of the pair of tubes 17 which are connected by the duct 20 with the discharge pipe 23, the liquid will flow more freely from than into the tank, thus to relieve undue pressure within the latter and obviate retarding the ingress of the liquid.

In the operation of filling the tank with the filtering material 32, the nuts 8 are removed and the cover 9 thrown open as in Fig. 3, after which the locking bar 33 is turned from engagement with the lugs 34 and the head 4 raised sufficiently for introducing the charcoal or filtering material into the tank. After a quantity of the filtering material has been introduced, the head 4 is again locked in place and the valve 28 opened to admit water or other liquid under pressure through the pipe 27 and passage 26 for forcing the piston 14 upward in the tank to properly compress and pack the filtering material. The valve 28 is then closed and a valve in the pipe 30 opened for discharging a part of the liquid from the tank, whereupon an additional quantity of the filtering material is introduced and the operation of the head or piston 14 repeated to again compress the packed material, it being understood that this operation is continued until the tank is completely filled with the filtering medium.

Having thus described my invention, what I claim is:

1. In a device of the class described, a tank having a cover and containing a charge of filtering material, a plurality of perforated tubes through the tank, an inlet pipe coupled to the cover and communicating with the upper end of one of said tubes, a discharge pipe also coupled to the cover and a duct connecting said discharge pipe for communication with the upper ends of a pair of said tubes.

2. In a device of the class described, a tank having a cover and containing a charge of filtering material, an inlet pipe coupled to the cover, a perforated tube communicating with said pipe and extended longitudinally through the filtering material in the tank, a discharge pipe coupled to the cover, a connecting duct opening into said discharge pipe and a pair of perforated tubes extended through the filtering material in the tank and having connection at their upper ends with the connecting duct.

3. In a device of the class described, a tank having a cover and containing a charge of filtering material, an inlet and a discharge pipe coupled to the cover, a perforated tube communicating with the inlet pipe and extended through the filtering material in the tank, a second perforated tube extending through the filtering medium in the tank and communicating at one end with a discharge pipe, a pressure head arranged for longitudinal movement in the tank, and means for admitting a liquid under pressure to operate the head for compressing the filtering material.

In testimony whereof, I affix my signature in presence of two witnesses.

AMBROSE D. DE LAND.

Witnesses:
L. C. MEYER,
D. W. HUENINK, JR.